US010242247B2

(12) United States Patent
Zhang et al.

(10) Patent No.: US 10,242,247 B2
(45) Date of Patent: *Mar. 26, 2019

(54) FINGERPRINT UNLOCKING METHOD AND TERMINAL

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,304

(22) Filed: Dec. 22, 2017

(65) Prior Publication Data

US 2018/0121708 A1  May 3, 2018

Related U.S. Application Data

(63) Continuation of application No. PCT/CN2016/093585, filed on Aug. 5, 2016.

(30) Foreign Application Priority Data

Mar. 15, 2016  (CN) .......................... 2016 1 0147997

(51) Int. Cl.
  *G06K 9/00* (2006.01)
  *H04M 1/725* (2006.01)
  (Continued)

(52) U.S. Cl.
  CPC ......... *G06K 9/00087* (2013.01); *G06F 21/32* (2013.01); *G06K 9/00006* (2013.01);
  (Continued)

(58) Field of Classification Search
  CPC ............ G06K 9/00087; G06K 9/0008; G06K 9/6202; G06K 9/001; G06K 9/0004;
  (Continued)

(56) References Cited

U.S. PATENT DOCUMENTS 8,582,838 B1 * 11/2013 McCormick ......... G07D 7/2033
                                                382/124
2006/0104493 A1 * 5/2006 Hsieh .................. G06K 9/00093
                                                382/125
(Continued)

FOREIGN PATENT DOCUMENTS

CN        103685232 A     3/2014
CN        103854013 A     6/2014
(Continued)

*Primary Examiner* — Michael Y Mapa
(74) *Attorney, Agent, or Firm* — Young Basile Hanlon & MacFarlane, P.C.

(57) ABSTRACT

A fingerprint unlocking method is provided. The method includes the follows. Fingerprint information is acquired. A target group number of a group of fingerprint templates that is most similar to the fingerprint information is determined from among preset fingerprint matching data; where the preset fingerprint matching data comprises N groups of fingerprint templates, each group of fingerprint templates correspond to one finger and have one unique identification group number, and N is an integer greater than 1. Match the fingerprint information with fingerprint templates corresponding to the target group number. A terminal is unlocked when a target matching value between a fingerprint template corresponding to the target group number and the fingerprint information is determined, where the target matching value is greater than a first preset threshold. A terminal is also provided.

17 Claims, 4 Drawing Sheets

(51) Int. Cl.
    *G06K 9/62*     (2006.01)
    *H04L 29/06*     (2006.01)
    *H04L 9/32*     (2006.01)
    *G06K 19/07*     (2006.01)
    *G06F 21/32*     (2013.01)

(52) U.S. Cl.
    CPC ......... *G06K 9/0008* (2013.01); *G06K 9/6202* (2013.01); *G06K 19/0718* (2013.01); *H04L 9/3231* (2013.01); *H04L 63/0861* (2013.01); *H04M 1/72577* (2013.01)

(58) Field of Classification Search
    CPC .......... G06K 9/00006; G06K 19/0718; H04M 1/72577; G06F 21/32; H04L 63/0861; H04L 9/3231; H04W 12/06; H04W 12/08
    USPC ................................................ 455/410–411
    See application file for complete search history.

(56) References Cited

U.S. PATENT DOCUMENTS

| | | | |
|---|---|---|---|
| 2015/0324569 A1 | 11/2015 | Hong et al. | |
| 2016/0104029 A1* | 4/2016 | Takagi | G06K 9/00006 |
| | | | 382/124 |
| 2016/0217312 A1* | 7/2016 | Gardiner | G06K 9/00087 |
| 2016/0314337 A1* | 10/2016 | Suh | G06K 9/00013 |

FOREIGN PATENT DOCUMENTS

| | | |
|---|---|---|
| CN | 104618577 A | 5/2015 |
| CN | 105389566 A | 3/2016 |
| EP | 2161676 A1 | 3/2010 |

\* cited by examiner

FINGERPRINT UNLOCKING METHOD AND TERMINAL

CROSS-REFERENCE TO RELATED APPLICATION(S)

This application is a continuation of PCT/CN2016/093585, filed on Aug. 5, 2016, which claims the priority of Chinese Application No. 201610147997.2, filed on Mar. 15, 2016, the disclosures of both of which are herein incorporated by reference in their entireties.

TECHNICAL FIELD

The present disclosure relates to the field of security technology, and particularly to a fingerprint unlocking method and a terminal.

BACKGROUND

Terminals (e.g., mobile phones, tablet PCs, etc.) are becoming widely used with the rapid development of information technology. Fingerprint identification technology, as a standard configuration technology of the terminal, can be widely used in unlocking, waking up, mobile payment, and other functions of the terminal. Meanwhile, to unlock quickly, manufacturers also focus on unlocking time of the terminal. The terminal may store multiple fingerprint templates in advance, and each finger (in other words, fingerprints of the finger) may correspond to multiple fingerprint templates. In the process of unlocking, when fingerprint information of a finger of a user is acquired, the terminal will match the fingerprint information acquired with fingerprint templates stored in the terminal. For example, for each fingerprint received, first match the fingerprint information with each fingerprint template corresponding to one finger, and if failed, match the fingerprint information with each fingerprint template corresponding to another finger, and so on. Such process reduces the efficiency of fingerprint unlocking.

BRIEF DESCRIPTION OF THE DRAWINGS

To describe the technical solutions in the implementations of the present disclosure more clearly, the following briefly introduces the accompanying drawings required for describing the implementations. Apparently, the accompanying drawings in the following description show some implementations of the present disclosure. Those of ordinary skill in the art may also obtain other drawings based on these accompanying drawings without creative efforts.

DETAILED DESCRIPTION

Figure 1:
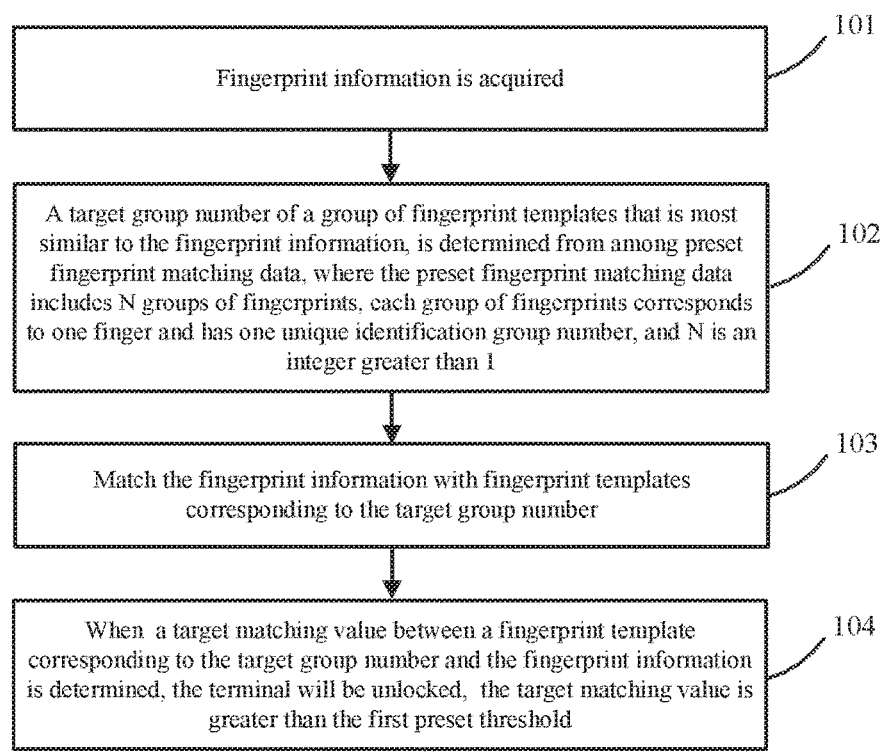
FIG. 1 is a schematic flow chart illustrating a fingerprint unlocking method according to a first implementation of the disclosure.

Implementations of the disclosure provide a fingerprint unlocking method and a terminal to improve efficiency of fingerprint unlocking.

Hereinafter, technical solutions embodied in implementations of the disclosure will be described in a clear and comprehensive manner in conjunction with the accompanying drawings. It is evident that the implementations described herein are merely some rather than all of the implementations of the disclosure. Those of ordinary skill in the art will be able to derive other implementations based on these implementations without creative work, and all such derived implementations shall fall in the protection scope of the disclosure.

Here is a brief description of terms or phrases used herein.

The terms "first", "second", "third", and "fourth" appearing in the present specification, claims, and drawings are intended for distinguishing different objects rather than describing a particular order. In addition, the terms "include", "comprise", "have" and any variations thereof are intended to cover non-exclusive inclusion. For example, a process, method, system, product, or apparatus that includes a series of steps or units, is not limited to the listed steps or units, but optionally may also include steps or units not listed, or alternatively other steps or units inherent to the process, method, product, or apparatus.

Reference herein to "implementation" means that specific features, structures, or characteristic described in connection with the implementations may be included in at least one implementation of the disclosure. The appearances of the phrase in various places in the specification are not necessarily all referring to the same implementation, nor are separate or alternative implementations mutually exclusive of other implementations. As one of ordinary skill in the art explicitly and implicitly appreciate, the implementations described herein may be combined with other implementations.

"Terminals" described in the implementations of the disclosure may include smart phones, tablet PCs, palmtops, laptops, mobile internet devices (MID), or wearable devices and so on. The terminals described above are merely illustrative and not exhaustive, which includes but not limited to the foregoing terminals.

The term "unit" or "module" refers to one or more physical or logical components or elements of a system. In some implementations, a unit may be a distinct circuit, while in other implementations a unit may include a plurality of circuits.

It is to be understood that the terminology used in the implementations of the present disclosure is for the purpose of describing particular implementations only and is not intended to limit the disclosure. Unless the context clearly dictates otherwise, phrases such as "a/an", "the", "one" and the like used in the implementations of the disclosure and the appended claims are also intended to include a majority. It is also to be understood that the phrase "and/or" used herein refers to and encompasses any or all of the possible combinations of one or more associated listed items. For example, for the purpose of the present disclosure, the phrases "A and/or B" and "A or B" mean (A), (B), or (A and B).

The term "registered fingerprint template" means that, when a fingerprint function of a terminal device such as a mobile phone is enabled for the first time, the user may be asked to undergo a fingerprint registration process. During the fingerprint registration, the user may put his or her finger on a fingerprint identification module (also known as fingerprint identification sensor, fingerprint sensor, fingerprint recognizer, and the like) for fingerprint image acquisition, and the fingerprint image received or acquired will be stored as a registered fingerprint template. Usually, one finger can have one or more than one fingerprint template stored in the terminal. Generally, the fingerprint identification module may receive 10-20 times for each finger in order to receive the whole fingerprint face and generate a comprehensive registered fingerprint template. Characteristic information can be obtained from the fingerprint image received, and for example, the fingerprint template can be saved in the form of image.

In the related art, when conducting fingerprint unlocking, a terminal, specifically, a fingerprint sensor or fingerprint module of the terminal has to receive fingerprint information from a finger of a user that is placed thereon, and then match the fingerprint information received with fingerprint templates stored in the terminal in advance, the terminal will be unlocked when the match is successful. Since the fingerprint information received is compared with all templates one by one randomly in the related art, it may take a long period for fingerprint unlocking and thus the efficiency of fingerprint unlocking is affected.

In implementations of the present disclosure, the fingerprint templates stored in the terminal can be regarded as being divided into multiple groups (N groups for example and N is an integer greater than 1), with each group of fingerprint templates include at least one fingerprint template and corresponds to one finger. For ease of management and the storing in the terminal, each group of fingerprint templates can be assigned with a group number, such as a unique identifier (ID). Obviously, each group number can be regarded as corresponding to one finger. Therefore, the multiple groups fingerprint templates stored in the terminal may correspond to different fingers, these fingers can belong to the same user or different users, or, these fingers can belong to the same hand or different hands of the user.

Based on the foregoing, when comparing the fingerprint information received from the finger and the fingerprint templates stored in the terminal, the terminal can first match the fingerprint information with at least one template of at least one group of fingerprint templates (can be referred to as a first matching process). To be specific, matching can be conducted between the fingerprint information and a fingerprint template most successfully matched. Alternatively, matching can be conducted between the fingerprint information and a fingerprint template most successfully matched in a preset time period. The present disclosure is not limited thereto.

At the first several times the technical schemes of the present disclosure is performed, the terminal may have to match the fingerprint information with each group of fingerprint templates to obtain the maximum matching value that is greater than or equal to the second threshold. With the increase in the number of matching, the user's unlocking habits gradually become obvious, for example, the user usually unlocks using the thumb; that is, from the perspective of the terminal, the group of fingerprint templates corresponding to the thumb is the most successfully matched group, and the terminal will first match the fingerprint information with the group of fingerprint templates corresponding to the thumb in the first matching process.

Continuing, the first matching process will obtain multiple matching values, and there is a maximum matching value among the multiple matching values. Next, different operations can be conducted per the maximum matching value.

If the maximum matching value is greater than a first threshold, the terminal can be unlocked directly.

On the other hand, if the maximum matching value is less than or equal to the first threshold and greater than a second threshold, the terminal will match the fingerprint information with fingerprint templates in the group of fingerprint templates that corresponds to the maximum matching value (can be referred to as a second matching process), and the terminal will be unlocked when a target matching value between the fingerprint information and any fingerprint template in the group of fingerprint templates that corresponds to the maximum matching value is greater than the first threshold. In the second matching process, the fingerprint templates that has subjected to the first matching process will be compared again in order to further improve the running speed of a processor and improve unlocking speed.

After unlocking, the terminal can sort and re-number the groups of fingerprint templates. For example, the group number of the group of fingerprint templates corresponds to the maximum matching value can be increased by 1 and consequently, the terminal can conduct matching based on the re-numbered groups of fingerprint templates next new fingerprint information is received for unlocking.

Implementations of the present disclosure will be described in detail below.

FIG. 1 is a schematic flow chart illustrating a fingerprint unlocking method according to a first implementation of the disclosure. The fingerprint unlocking method described in this implementation may include the following operations.

At block 101, fingerprint information is acquired.

According to the implementation of the disclosure, a terminal can acquire the fingerprint information in a process of pressing a fingerprint identification module by a user. The fingerprint information may be ridge features of a fingerprint collected or a fingerprint image collected when the user presses the fingerprint identification module.

The fingerprint information can be a fingerprint image for example. In this case, matching values between the fingerprint image collected and fingerprint templates may be determined. For example, the "matching value" referred to herein may be the number of feature points successfully matched. If a matching value reaches a certain threshold, it can be considered that the fingerprint image is matched with a fingerprint template successfully; otherwise, if the matching value does not reach the certain threshold, it can be considered that the fingerprint image is not matched with the fingerprint template. The fingerprint information can also be ridge features of a fingerprint, that is, fingerprint feature-pattern contained in the fingerprint image.

The fingerprint feature may refer to feature points (also known as minutiae, interest point) of the fingerprint, such as corners contained in the fingerprint image, for example, Harris corners, scale invariant feature transform (SIFT) corners of the fingerprint. Based on this, matching values between the feature points collected and the fingerprint templates can be determined. If a matching value reaches a certain threshold, it can be considered that the feature points are matched with a fingerprint template successfully; otherwise, if the matching value does not reach the certain threshold, it is considered that the feature points are not matched with the fingerprint template.

At block 102, a target group number of a group of fingerprint templates that is most similar (in other words, with the highest similarity) to the fingerprint information is determined from among preset fingerprint matching data. The target group number corresponds to a group of fingerprint templates corresponding to a maximum matching value, which will be described in detail below.

The preset fingerprint matching data includes N groups of fingerprint templates, each group of fingerprint templates includes multiple fingerprint templates corresponding to one finger. Besides, each group of fingerprint templates has one unique identification group number, and N is an integer greater than 1. For example, N can be 5, 10, other appropriate integers.

According to implementations of the disclosure, the preset fingerprint matching data is stored in the terminal. The terminal can number the N groups of fingerprint templates sequentially or randomly. After numbering, each group of fingerprint templates has one identification unique group number (such as group ID). Further, the terminal can determine the target group number of a group of fingerprint templates that is most similar to the fingerprint information, from among the preset fingerprint matching data. The terminal can match the fingerprint information with at least one fingerprint template of at least one of the N groups of fingerprint templates to obtain multiple matching values, and then a group of fingerprint templates corresponding to the maximum matching value can be regarded as a group of fingerprint templates that is most similar to the fingerprint information. Alternatively, the terminal may match a portion of the fingerprint information with a portion of at least one fingerprint template of at least one of the N groups of fingerprint templates to obtain multiple matching values, and then a group of fingerprint templates corresponding to the maximum matching value can be selected as the group of fingerprint templates that is most similar to the fingerprint information.

The N groups of fingerprint templates may correspond to multiple fingers of the same user or different users. For example, there are three groups of fingerprint templates, that is, a first group of fingerprint templates, a second group of fingerprint templates, and a third group of fingerprint templates. Assuming that the first group of fingerprint templates is from fingerprints of the middle finger of the left hand of a user, and include five fingerprint templates, that is, the user pressed his/her middle finger of the left hand for at least five times when the user registered the fingerprints. The second group of fingerprint templates is from fingerprints of the thumb of the user's left hand, and includes eight fingerprint templates. The third group of fingerprint templates is from fingerprints of the thumb of the right hand of the user, and includes ten fingerprint templates. Then those three groups of fingerprint templates are numbered in ascending order of the number of the fingerprint templates for example; as can be seen, the first group of fingerprint templates corresponds to group number 1, similarly, the second group of fingerprint templates corresponds to group number 2, and the third group of fingerprint templates corresponds to group number 3.

As mentioned above, multiple groups of fingerprint templates come from different fingers respectively may be stored in the terminal. Due to the difference between fingerprints of different fingers, when match fingerprint information of finger A with fingerprint information of finger B, a matching value obtained will be very low, typically less than 10% for example. Therefore, it may be determined first which group of fingerprint templates the fingerprint information to be matched is from, that is, determine the target group number first.

In implementations of the disclosure, the fingerprint information may be first compared with fingerprint templates of each of the N groups of fingerprint templates to determine which group of fingerprint templates is most similar to the fingerprint information. In one implementation, when the terminal matches the fingerprint information with any fingerprint template, a matching value can be obtained. Similarly, when the terminal matches the fingerprint information with at least one fingerprint template of each of the N groups of fingerprint templates respectively, multiple matching values will be obtained. For example, the terminal can determine the maximum matching value among the multiple matching values, and judge whether the maximum matching value is greater than or equal to a first preset threshold, such as 75%, 80%, 85%, 90%, 91%, 91.1%, 95%, and so on, and the disclosure is not limited thereto. When the maximum matching value is less than the first preset threshold, the terminal can determine a group number corresponding to a fingerprint template having the maximum matching value to be the target group number.

At block 103, match (in other words, compare) the fingerprint information with fingerprint templates corresponding to the target group number.

Since part of the fingerprint templates corresponding to the target group number have been matched at block 102, fingerprint templates corresponding to the target group number and have not subjected to matching can be easily determined at 103, and accordingly, at block 103, the terminal can match the fingerprint information with the fingerprint templates that have not subjected to matching. In the process of matching the fingerprint information with the fingerprint templates that have not subjected to matching, when the target matching value between a fingerprint template of the fingerprints corresponding to the target group number and the fingerprint information appears, then proceeding to unlocking at block 104; that is, when the target matching value greater than the first preset threshold appears, unlocking is implemented. The first preset threshold may be set as 0.6, 0.65, 0.7, 0.75, 0.8, 0.811, 0.85, 0.9, 0.95, and so on, and the disclosure is not limited thereto.

At block 104, when a target matching value between a fingerprint template of the fingerprints corresponding to the target group number and the fingerprint information is determined, the terminal will be unlocked. Where the target matching value is greater than the first preset threshold.

As one implementation, the terminal was in a screen-off state prior to block 101, and in this situation, a screen of the terminal can be lit up and unlocked desktop icons can be displayed after the terminal is unlocked. As another example, the terminal is in a screen-on state prior to block 101, and in this situation, the unlocked desktop icons can be displayed after the terminal is unlocked. As another example, the terminal is in a screen-off state prior to block 101, and in this situation, the screen of the terminal can be lit up, and an application associated with a fingerprint template that has been matched successfully can be initiated, or a preset page of the application associated with the fingerprint template that has been matched successfully can be opened after the terminal is unlocked. As another example, the terminal is in a screen-on state prior to block 101, then an application associated with a fingerprint template that has been matched successfully can be initiated, or a preset page of the application associated with the fingerprint template that has been matched successfully can be opened, after the terminal is unlocked. The above preset page may also be a main page of an application, a designated page, or a most frequently used page.

Through implementations of the disclosure, the fingerprint information is acquired, and the target group number of the group of fingerprint templates that is most similar to the fingerprint information is determined from among the preset fingerprint matching data. Thereafter, match the fingerprint information with the fingerprint templates corresponding to the target group number. The terminal will be unlocked when the target matching value between a fingerprint template corresponding to the target group number and the fingerprint information is determined, and the target matching value is greater than the first preset threshold. In other words, in implementations of the disclosure, match at least one fingerprint template selected from the multiple groups of fingerprint templates with the fingerprint information, to determine which group of fingerprint templates is most similar to the fingerprint information, and match the fingerprint information with the fingerprint templates of the group of fingerprint templates that is most similar to the fingerprint information. Therefore, compared with the related art wherein the fingerprint information is compared with fingerprint templates stored in the terminal randomly, it is possible to reduce the number of fingerprint matching and improve the efficiency of fingerprint unlocking.

As mentioned before, based on the maximum matching value determined at block 102, different operations may be conducted. In one implementation, the maximum matching value is less than or equal to the first preset threshold and greater than the second preset threshold, and in another implementation, the maximum matching value is greater than the first preset threshold.

The main purpose of setting two threshold values (that is, the first threshold and the second threshold) is that, unlocking can be implemented directly if the maximum matching value is greater than the first preset threshold; otherwise, if the maximum matching value is less than the second preset threshold, it indicates that the maximum matching value is too low and therefore there is no need to be compared, thus prompting a user to re-input fingerprint information directly, thereby improving the efficiency of terminal unlocking. Consequently, in case of multiple groups of fingerprint templates, no matching is needed when the maximum matching value is lower, thereby avoiding wasting too much time for unlocking.

Figure 2:
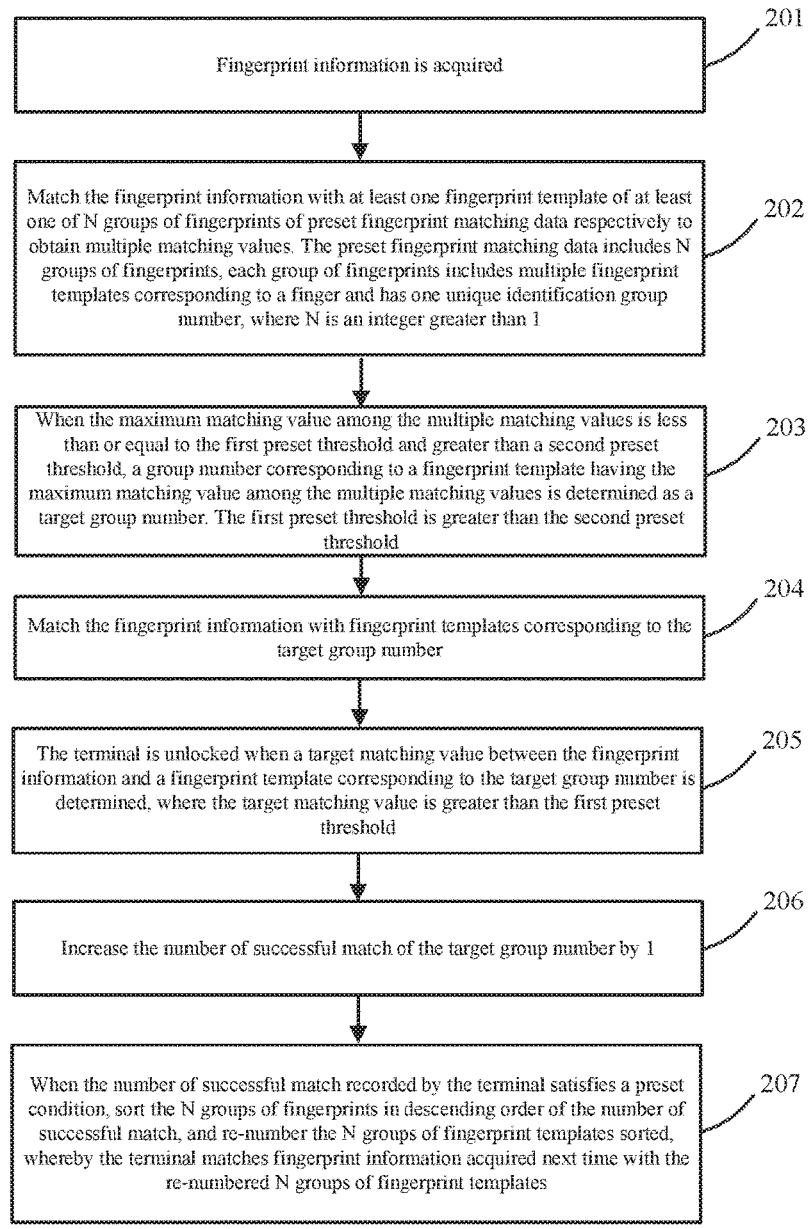
FIG. 2 is a schematic flow chart illustrating a fingerprint unlocking method according to a second implementation of the disclosure.

FIG. 2 is a schematic flow chart illustrating a fingerprint unlocking method according to a second implementation of the disclosure. The method includes the following operations. In this implementation, the maximum matching value determined at block 102 is less than or equal to the first preset threshold and greater than the second preset threshold.

At block 201, fingerprint information is acquired.

At block 202, match the fingerprint information with at least one fingerprint template of at least one of N groups of fingerprint templates of preset fingerprint matching data respectively to obtain multiple matching values. The preset fingerprint matching data includes the N groups of fingerprint templates, each group of fingerprint templates corresponds to one finger and has one unique identification group number, where N is an integer greater than 1.

In the implementation, the terminal can match the fingerprint information with at least one fingerprint template of at least one of the N groups of fingerprint templates to obtain multiple matching values, and then a group of fingerprint templates corresponding to the maximum matching value can be regarded as a group of fingerprint templates that is most similar to the fingerprint information. Alternatively, the terminal may match a portion of the fingerprint information with a portion of at least one fingerprint template of at least one of the N groups of fingerprint templates to obtain multiple matching values, and then a group of fingerprint templates corresponding to the maximum matching value can be selected as the group of fingerprint templates that is most similar to the fingerprint information.

The manner in which the terminal matches the fingerprint information with at least one fingerprint template of at least one of the N groups of fingerprint templates respectively to obtain the multiple matching values can be various. For example, the terminal can match the fingerprint information with the fingerprint template most successfully matched (that is, the fingerprint template has the largest number of successful match) of at least one of the N groups of fingerprint templates; or the terminal may match the fingerprint information with a fingerprint template most successfully matched in a preset time period of at least one of the N groups of fingerprint templates. The preset time period may be 24 hours, one weak, one month, one year, and so on; the disclosure is not limited thereto.

At block 203, the maximum matching value among the multiple matching values is less than or equal to the first preset threshold and greater than a second preset threshold, and a group number corresponding to a fingerprint template having the maximum matching value is determined as a target group number. The first preset threshold is greater than the second preset threshold.

The terminal can determine a group number corresponding to the fingerprint template having the maximum matching value among the multiple matching values as the target group number. The second preset threshold may be 0.1, 0.2, 0.05, 0.3, 0.4, 0.5, 0.045, 0.23, 0.341 and so on, and the present disclosure it is not limited thereto.

At block 204, match the fingerprint information with fingerprint templates corresponding to the target group number.

Optionally, since part of the fingerprint templates corresponding to the fingerprints with the target group number have been matched at block 202, the terminal may match the fingerprint information with fingerprint templates corresponding to the target group number and have not been matched.

For the fingerprint templates corresponding to the target group number, assuming that there are multiple fingerprint templates that have not been matched. The terminal can match the fingerprint information with at least one of the multiple fingerprint templates sequentially (in some situations, match the fingerprint information with each of the multiple fingerprint templates). Assuming fingerprint templates A, B, and C have been not subjected to matching. First, the terminal can match the fingerprint information with fingerprint template A, if a matching value is less than the first preset threshold, that is, if the match fails, the terminal will then match the fingerprint information with fingerprint template B, if matched successfully, the terminal will be unlocked and there is no need to match the fingerprint information with fingerprint template C.

At block 205, the terminal is unlocked when a target matching value between the fingerprint information and a fingerprint template of the fingerprints corresponding to the target group number is determined, where the target matching value is greater than the first preset threshold.

At block 206, when a fingerprint template corresponding to the target group number is matched successfully at block 205, increase the number of successful match of the target group number by 1.

At block 207, sort the N groups of fingerprint templates in descending order of the number of successful match, and re-number the N groups of fingerprint templates sorted, whereby the terminal matches fingerprint information acquired next time with the re-numbered N groups of fingerprint templates.

Sorting and re-numbering can be conducted when the number of successful match recorded by the terminal satisfies a preset condition. In an implementation, when the number of successful match recorded by the terminal satisfies the preset condition, the terminal can sort the N groups of fingerprint templates in descending order of the number of successful match. The preset condition can be that the number of successful match recorded is an integral multiple of a certain number; or the preset condition can be that the number of successful match reaches a certain threshold. In particular, the terminal can set multiple threshold values such as 100, 200, 500, 10, 20, 30, and so on. When the number of successful match reaches one of those threshold values, the terminal can sort the N groups of fingerprint templates in descending order of the number of successful match. Further, after sorting, the terminal can match fingerprint information acquired next time with the foregoing re-numbered N groups of fingerprint templates.

As one implementation, the terminal can count the number of successful unlocking of each fingerprint template corresponding to each group of fingerprint templates, and match the fingerprint information with the fingerprint template most successfully matched first at block 202.

According to the implementations of the disclosure, the fingerprint information is acquired, and the target group number of the group of fingerprint templates that is most similar to the fingerprint information is determined from among the preset fingerprint matching data. Thereafter, match the fingerprint information with the fingerprint templates corresponding to the target group number. The terminal will be unlocked when the target matching value between a fingerprint template of the fingerprints corresponding to the target group number and the fingerprint information is determined, and the target matching value is greater than the first preset threshold. In other words, in implementations of the disclosure, match at least one fingerprint template selected from the multiple groups of fingerprint templates with the fingerprint information to determine which group of fingerprint templates is most similar to the fingerprint information, and match the fingerprint information with the fingerprint templates of the group of fingerprint templates that is most similar to the fingerprint information, thereby reducing the number of fingerprint matching and improving the efficiency of fingerprint unlocking. Furthermore, the multiple groups of fingerprint templates are sorted according to the number of successful match, and it is possible to further optimize the unlocking efficiency.

Figure 3:
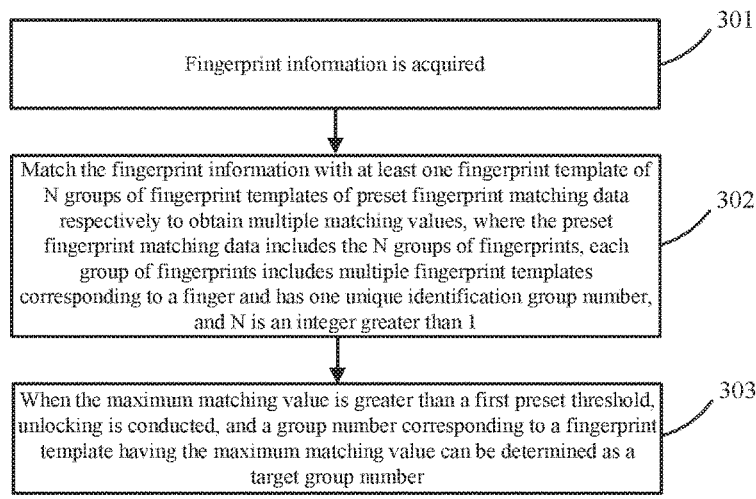
FIG. 3 is a schematic flow chart illustrating a fingerprint unlocking method according to a third implementation of the disclosure.

FIG. 3 is a schematic flow chart illustrating a fingerprint unlocking method according to a third implementation of the disclosure. The fingerprint unlocking method according to the third implementation includes the following operations. The maximum matching value determined at block 102 is greater than the first preset threshold.

At block 301, fingerprint information is acquired.

At block 302, match the fingerprint information with at least one fingerprint template of at least one of N groups of fingerprint templates of preset fingerprint matching data respectively to obtain multiple matching values, where the preset fingerprint matching data includes the N groups of fingerprint templates, each group of fingerprint templates includes multiple fingerprint templates corresponding to one finger. Each group of fingerprint templates has one unique identification group number (such as a group ID), and N is an integer greater than 1.

As an implementation, the terminal can match the fingerprint information with at least one fingerprint template of at least one of the N groups of fingerprint templates to obtain multiple matching values, and a group of fingerprint templates corresponding to the maximum matching value obtained can be regarded as a group of fingerprint templates that is most similar to the fingerprint information. Alternatively, the terminal can match a portion of fingerprint information with a portion of fingerprint information of at least one fingerprint template of at least one of the N groups of fingerprint templates, and then a group of fingerprint templates corresponding to the maximum matching value obtained can be served as the group of fingerprint templates that is most similar to the fingerprint information.

At block 303, the maximum matching value is greater than a first preset threshold, the terminal is unlocked. Here, a group number corresponding to a fingerprint template having the maximum matching value can be determined as a target group number.

In this implementation, when the maximum matching value among the multiple matching values is greater than the first preset threshold, where the first preset threshold is a matching lower limit required for successful unlocking, the terminal will be unlocked directly, and the group number corresponding to the fingerprint template having the maximum matching value will be determined as the target group number.

According to implementations of the disclosure, match the fingerprint information with at least one fingerprint template of at least one of the N groups of fingerprint templates of the preset fingerprint matching data to obtain the multiple matching values. When the maximum matching value among the multiple matching values is greater than the first preset threshold, the terminal will be unlocked directly, and the group number corresponding to the fingerprint template having the maximum matching value among the multiple matching values is determined as the target group number. As can be seen, in the process of matching at least one fingerprint template of the multiple groups of fingerprint templates, when the maximum matching value is greater than the first preset threshold, the unlocking will be directly performed, so as to improve the unlocking efficiency for a terminal.

Figure 4:
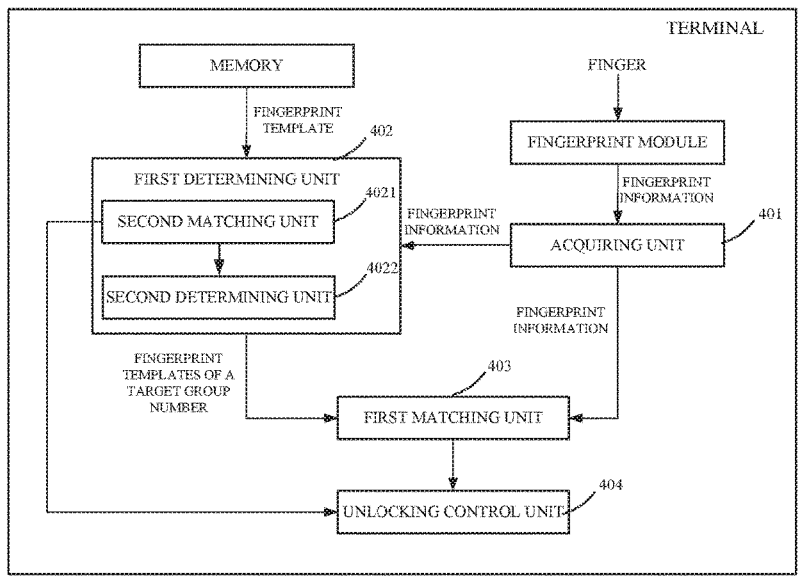
FIG. 4 is a schematic structural diagram illustrating a terminal according to a fourth implementation of the disclosure.

FIG. 4 is a schematic structural diagram illustrating a terminal according to a fourth implementation of the disclosure. The terminal includes an acquiring unit 401, a first determining unit 402, a first matching unit 403, and an unlocking control unit 404. The above components can be integrated into a fingerprint module of the terminal for example, or coupled with the fingerprint module. The acquiring unit 401 can be a sensor, such as an infrared sensor, a thermal sensor, or a photoelectric sensor. The first determining unit 402 can be a logic circuit, a controller, or a processor. The first matching unit 403 can be implemented via a comparator or a comparing circuit. The unlocking control unit 404 can be implemented via a controller.

The acquiring unit 401 is configured to acquire fingerprint information.

The first determining unit 402 is configured to determine, from among preset fingerprint matching data, a target group number of a group of fingerprint templates that is most similar to the fingerprint information acquired by the acquiring unit 401. The preset fingerprint matching data includes N groups of fingerprint templates, each group of fingerprint templates includes at least one fingerprint templates corresponding to one finger. Each group of fingerprint templates has one unique identification group number. N is an integer greater than 1.

The first matching unit 403 is configured to match the fingerprint information acquired by the acquiring unit 401 with all or part fingerprint templates corresponding to the target group number determined by the first determining unit 402.

The unlocking control unit 404 is configured to unlock the terminal when a target matching value between a fingerprint template of the fingerprints corresponding to the target group number and the fingerprint information is determined by the first matching unit 403, where the target matching value is greater than first preset threshold.

To be specific, the acquiring unit 401 is configured to acquire the fingerprint information in a process of pressing a fingerprint identification module, where the fingerprint information may be ridge features of a fingerprint, or a fingerprint image.

In one implementation, the first determining unit 402 includes a second matching unit 4021 and a second determining unit 4022.

The second matching unit 4021 is configured to match the fingerprint information with at least one fingerprint template of at least one of the N groups of fingerprint templates, so as to obtain multiple matching values.

The second determining unit 4022 is configured to determine a group number corresponding to a fingerprint template having the maximum matching value among the multiple matching values determined by the second matching unit 4021 to be a target group number.

In one implementation, the maximum matching value is less than or equal to the first preset threshold and greater than a second preset threshold; where the first preset threshold is greater than the second preset threshold.

In another implementation, the maximum matching value is greater than the first preset threshold. In this case, the unlocking control unit 404 is configured to unlock the terminal directly after the matching of the second matching unit 4021.

As one implementation, the second matching unit 4021 is configured to match the fingerprint information with a fingerprint template most successfully matched of at least one of the N groups of fingerprint templates; or the second matching unit 4021 is configured to match the fingerprint information with a fingerprint template most successfully matched in a preset time period of at least one of the N groups of fingerprint templates.

Figure 5:
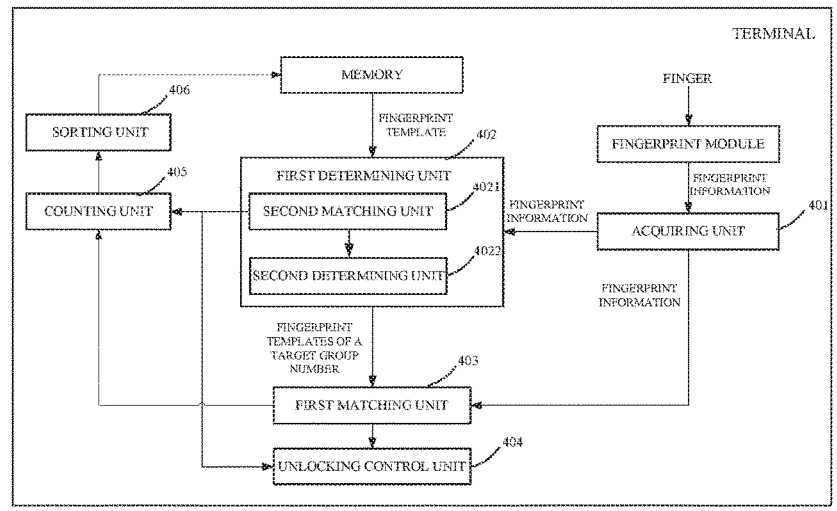
FIG. 5 is still another schematic structural diagram illustrating a terminal according to another implementation of the disclosure.

As one implementation, as illustrated in FIG. 5, the terminal illustrated in FIG. 4 further includes a counting unit 405 and a sorting unit 406.

The counting unit 405 is configured to increase the number of successful match of the target group number by 1 after the unlocking control unit 404 unlocks the terminal or after the matching of the first matching unit 403 is successful.

The sorting unit 406 is configured to sort the N groups of fingerprint templates in descending order of the number of successful match, and re-number the N groups of fingerprint templates sorted, whereby the first matching unit 403 can match fingerprint information acquired next time with the re-numbered N groups of fingerprint templates. In one implementation, the sorting unit 406 is configured to sort and re-number the N groups of fingerprint templates when the number of successful match recorded by the terminal satisfies a preset condition. Reference can be made to the foregoing descriptions for details.

According to the terminal described in the implementations, the acquiring unit 401 can acquire the fingerprint information, and the first determining unit 402 can determine, from among the preset fingerprint matching data, the target group number of the group of fingerprint templates that is most similar to the fingerprint information; Thereafter, the first matching unit 403 can match the fingerprint information with the fingerprint templates corresponding to the target group number. The terminal will be unlocked via the unlocking control unit 404 under certain conditions. For example, the terminal can be unlocked when the target matching value between a fingerprint template of the fingerprints corresponding to the target group number and the fingerprint information is determined, and the target matching value is greater than the first preset threshold. Alternatively, the terminal can be unlocked directly when the maximum matching value determined by the second matching unit 4021 is greater than the first preset threshold. As such, match at least one fingerprint template selected from the multiple groups of fingerprint templates with the fingerprint information to determine which group of fingerprint templates is most similar to the fingerprint information, and match the fingerprint information with the fingerprint templates of the group of fingerprint templates that is most similar to the fingerprint information. Therefore, it is possible to reduce the number of fingerprint matching and improve the efficiency of fingerprint unlocking.

Figure 6:
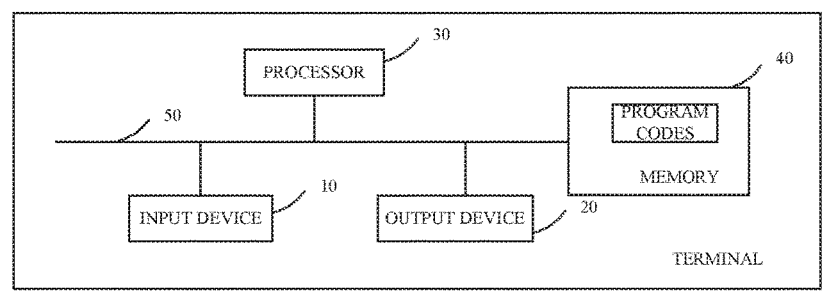
FIG. 6 is a schematic structural diagram illustrating a terminal according to another implementation of the disclosure.

FIG. 6 is a schematic structural diagram illustrating a terminal according to a second implementation of the disclosure. The terminal includes at least one input device 10, at least one output device 20, at least one processor 30, e.g., a CPU, and a memory 40. The input device 10, the output device 20, the at least one processor 30, and the memory 40 are connected via a bus 50.

The input device 10 may be a physical key, a touch panel, a mouse, or a fingerprint identification module (that is, fingerprint sensor).

The output device 20 can be a display screen.

The memory 40 can be a high-speed random access memory (RAM), or a non-volatile memory, such as a disk storage device. The memory 40 is configured to store a group of program codes. The input device 10, the output device 20, and the at least one processor 30 are configured to invoke the program codes stored in the memory 40 to perform the following operations.

The processor 30 is configured to acquire preset fingerprint matching data from the terminal, for example, from the memory 40, where the preset fingerprint matching data includes N groups of fingerprint templates, each group of fingerprint templates corresponds to a finger and has one unique identification group number. N is an integer greater than 1.

The input device 10 is configured to acquire fingerprint information.

The processor 30 is configured to determine, from among the preset fingerprint matching data, a target group number of a group of fingerprint templates that is most similar to the fingerprint information.

The processor 30 is further configured to match the fingerprint information with the fingerprint templates corresponding to the target group number.

When the target matching value between a fingerprint template corresponding to the target group number and the fingerprint information is determined, the processor 30 is further configured to unlock the terminal, where the target matching value is greater than the first preset threshold.

In one implementation, the input device 10 configured to acquire the fingerprint information is specifically configured to acquire the fingerprint information in a process of pressing a fingerprint identification module, where the fingerprint information can be ridge features of a fingerprint, or a fingerprint image.

In one implementation, the processor 30 configured to determine, from among the preset fingerprint data, the target group number of the group of fingerprint templates that is most similar to the fingerprint information, is further configured to: match the fingerprint information with at least one fingerprint template of at least one of the N groups of fingerprint templates respectively to obtain multiple matching values, and determine a group number corresponding to the fingerprint template having the maximum matching value among the multiple matching values to be target group number when the maximum matching value is less than or equal to the first preset threshold and greater than a second preset threshold, where the first preset threshold is greater than the second preset threshold.

In one implementation, the processor 30 configured to match the fingerprint information with at least one fingerprint template of at least one of the N groups of fingerprint templates of the preset fingerprint matching data is further configured to: match the fingerprint information with a fingerprint template most successfully matched or with a fingerprint template most successfully matched in a preset time period of at least one of the N groups of fingerprint templates.

In one implementation, after matching the fingerprint information with at least one fingerprint template of at least one of the N groups of fingerprint templates to obtain the multiple matching values, the processor 30 is further configured to: execute unlocking when the maximum matching value among the multiple matching values is greater than the first preset threshold, and determine a group number corresponding to the fingerprint template having the maximum matching value as the target group number.

After unlocking, the processor 30 is further configured to increase the number of successful match of the target group number by 1.

The processor 30 is further configured to sort the N groups of fingerprint templates in descending order of the number of successful match, and re-number the N groups of fingerprint templates sorted, for example, when the number of successful match recorded by the terminal satisfies a preset condition, whereby the terminal matches fingerprint information acquired next time with the re-numbered N groups of fingerprint templates.

In one implementation, the processor 30 configured to match the fingerprint information with the fingerprint templates corresponding to the target group number is further configured to: match the fingerprint information with the fingerprint templates that have not subjected to matching yet of the fingerprints corresponding to the target group number.

The input device 10, the output device 20, and the processor 30 can implement the fingerprint unlocking method of the first implementation, the second implementation, and the third implementation of this disclosure, or can implement the terminal provided by the implementations of the disclosure, and it will not be repeated again.

A computer storage medium is also provided. The computer storage medium is configured to store programs, when executed, the programs can implement part or all operations of any of the foregoing fingerprint unlocking methods.

In the foregoing implementations, the description of each implementation has its own emphasis. For the parts that are not described in detail in one implementation, reference may be made to related descriptions in other implementations.

It should be noted that, for the sake of brief description, the method implementations are described as a series of operation combinations. However, those skilled in the art should understand that the present disclosure is not limited to the described sequence of operations, because certain steps may be performed in other sequences or concurrently according to the present disclosure. Secondly, those skilled in the art should also know that the implementations described in the specification are preferred implementations, and the actions and modules involved are not necessarily required.

In the foregoing implementations, the description of each implementation has its own emphasis. For the parts that are not described in detail in one implementation, reference may be made to related descriptions in other implementations.

It should be understood that, in the implementations provided in the present disclosure, the disclosed apparatus may be implemented in other manners. For example, the device implementations described above are merely exemplary. For example, the unit division is merely logical function division and may be otherwise divided in actual implementation. For example, a plurality of units or components may be combined or may be integrate into another system, or some features may be ignored or not executed. In addition, the illustrated or discussed mutual coupling or direct coupling or communication connection may be indirect coupling or communication connection through some interfaces, devices or units, and may be electrical or other forms.

The units described as separate components may or may not be physically separated. The components illustrated as units may be or may not be physical units, that is, may be located in one place or may also be distributed on multiple network units. Some or all of the units may be selected according to actual needs to achieve the objectives of the solution in this implementation.

In addition, each functional unit in each implementation of the present disclosure may be integrated into one processing unit, or each unit may exist alone physically, or two or more units may be integrated into one unit. The above-mentioned integrated unit can be implemented in the form of hardware or in the form of software functional unit.

When the integrated unit is implemented in the form of a software functional unit and is sold or used as an independent product, the integrated unit may be stored in a computer-readable storage medium. Based on such understanding, the technical solution of the present disclosure essentially, or the part contributing to the prior art, or all or part of the technical solution, may be embodied in the form of a software product stored in a storage medium, which includes several instructions for causing a computer device (such as a personal computer, a server, or a network device) to execute all or part of the steps of the method according to the implementations of the present disclosure. The foregoing storage medium includes various media capable of storing program code, such as a USB flash disk, a read-only memory (ROM), a random access memory (RAM), a removable hard disk, a magnetic disk, or an optical disk.

The foregoing implementations are intended for describing rather than limiting the technical solutions of the present disclosure. Although the present disclosure is described in detail with reference to the foregoing implementations, it should be understood by those skilled in the art that, the technical solutions described in the implementations can be modified, or equivalent replacements can be made to some of the technical features in the implementations, and these modifications or replacements do not make the essence of the corresponding technical solutions depart from the scope of the technical solutions in the implementations of the present disclosure.

What is claimed is:

1. A method for fingerprint unlocking, comprising:
acquiring fingerprint information;
determining, from among preset fingerprint matching data, a target group number of a group of fingerprint templates that is most similar to the fingerprint information, the preset fingerprint matching data comprising N groups of fingerprint templates, wherein each group of fingerprint templates corresponds to one finger and has one unique identification group number, and N is an integer greater than 1, wherein each group of fingerprint templates comprises at least two fingerprint templates;
matching the fingerprint information with fingerprint templates corresponding to the target group number; and
unlocking when a target matching value between a fingerprint template corresponding to the target group number and the fingerprint information is determined, wherein the target matching value is greater than a first preset threshold; and further comprising:
after unlocking, increasing a number of successful match of the target group number by 1; and
sorting the N groups of fingerprint templates in descending order of the number of successful match, and re-numbering the N groups of fingerprint templates sorted, whereby a terminal matches fingerprint information acquired next time with the re-numbered N groups of fingerprint templates.

2. The method of claim 1, wherein acquiring the fingerprint information comprises:
collecting the fingerprint information in a process of pressing a fingerprint identification module by a user, wherein the fingerprint information comprises ridge features of a fingerprint, or a fingerprint image.

3. The method of claim 2, wherein determining, from among preset fingerprint matching data, a target group number of a group of fingerprint templates that is most similar to the fingerprint information comprises:
matching the fingerprint information with at least one fingerprint template of at least one of the N groups of fingerprint templates respectively, to obtain multiple matching values; and
determining a group number corresponding to a fingerprint template having a maximum matching value among the multiple matching values to be the target group number.

4. The method of claim 3, wherein matching the fingerprint information with at least one fingerprint template of at least one of the N groups of fingerprint templates respectively comprises one of:
matching the fingerprint information with a fingerprint template most successfully matched of at least one of the N groups of fingerprint templates; and
matching the fingerprint information with a fingerprint template most successfully matched in a preset time period of at least one of the N groups of fingerprint templates.

5. The method of claim 3, wherein the maximum matching value is less than or equal to the first preset threshold and greater than a second preset threshold, and wherein the first preset threshold is greater than the second preset threshold.

6. The method of claim 3, wherein the maximum matching value is greater than the first preset threshold, and the method further comprises:
after determining the target group number, proceeding to unlocking directly.

7. The method of claim 1, wherein sorting the N groups of fingerprint templates in descending order of the number of successful match comprises:
sorting the N groups of fingerprint templates in descending order of the number of successful match when the number of successful match recorded by the terminal satisfies a preset condition.

8. The method of claim 1, wherein matching the fingerprint information with the fingerprint templates corresponding to the target group number comprises:
matching the fingerprint information with fingerprint templates that corresponds to the target group number and have not been subjected to matching.

9. A terminal, comprising:
at least one processor; and
a memory coupled with the processor and configured to store program codes, wherein the program codes, when executed, cause the processor to perform:
an acquiring unit, configured to acquire fingerprint information;
a first determining unit, configured to determine, from among preset fingerprint matching data, a target group number of a group of fingerprint templates that is most similar to the fingerprint information acquired by the acquiring unit, the preset fingerprint matching data comprising N groups of fingerprint templates, wherein each group of fingerprint templates corresponds to one finger and has one unique identification group number, and N is an integer greater than 1, wherein each group of fingerprint templates comprises at least two fingerprint templates;
a first matching unit, configured to match the fingerprint information acquired by the acquiring unit with all or part of fingerprint templates corresponding to the target group number determined by the first determining unit; and
an unlocking control unit, configured to unlock the terminal when the first matching unit determines a target matching value between a fingerprint template corresponding to the target group number and the fingerprint information, the target matching value being greater than a first preset threshold; and
a counting unit, configured to increase a number of successful match of the target group number by 1 after the unlocking control unit unlocks the terminal; and
a sorting unit, configured to sort the N groups of fingerprint templates in descending order of the number of successful match, and re-number the N groups of fingerprint templates sorted, wherein the first matching unit matches fingerprint information acquired next time with the re-numbered N groups of fingerprint templates.

10. The terminal of claim 9, wherein the acquiring unit is further configured to collect the fingerprint information in a process of pressing a fingerprint identification module by a user, wherein the fingerprint information is ridge features of a fingerprint, or a fingerprint image.

11. The terminal of claim 10, wherein the first determining unit comprises:
a second matching unit, configured to match the fingerprint information with at least one fingerprint template of at least one of the N groups of fingerprint templates respectively, to obtain multiple matching values; and
a second determining unit, configured to determine a group number corresponding to a fingerprint template having a maximum matching value among the multiple matching values to be the target group number.

12. The terminal of claim 11, wherein the second matching unit is configured to:
match the fingerprint information with a fingerprint template most successfully matched of at least one of the N groups of fingerprint templates; or
match the fingerprint information with a fingerprint template most successfully matched in a preset time period of at least one of the N groups of fingerprint templates.

13. The terminal of claim 11, wherein when the maximum matching value is less than or equal to the first preset threshold and greater than a second preset threshold, and wherein the first preset threshold is greater than the second preset threshold.

14. The terminal of claim 11, wherein the unlocking control unit is further configured to unlock the terminal when the maximum matching value is greater than the first preset threshold.

15. A method for fingerprint unlocking, comprising:
acquiring fingerprint information;
performing a first matching process of matching the fingerprint information with preset fingerprint matching data to obtain multiple matching values, wherein the preset fingerprint matching data comprises N groups of fingerprint templates, wherein each group of fingerprint templates corresponds to one finger and has one unique identification group number, wherein N is an integer greater than 1, wherein each group of fingerprint templates comprises at least two fingerprint templates;
unlocking a terminal when the maximum matching value among the multiple matching values is greater than a first threshold;
performing a second matching process when the maximum matching value is less than or equal to a first preset threshold and greater than a second preset threshold, wherein the first preset threshold is greater than the second preset threshold, wherein the second matching process matches the fingerprint information with the group of fingerprint templates corresponding to the maximum matching value; and
unlocking the terminal when a target matching value between any fingerprint template corresponding to the maximum matching value and the fingerprint information is determined, wherein the target matching value is greater than the first preset threshold; and further comprising:
determining a group number of a group of fingerprint templates corresponding to the maximum matching value as a target group number;
increasing a number of successful match of the target group number by 1 after unlocking; and
sorting and then re-numbering the N groups of fingerprint templates in descending order of the number of successful match, whereby the terminal matches fingerprint information acquired next time with the re-numbered N groups of fingerprint templates.

16. The method of claim 15, wherein performing the first matching process of matching the fingerprint information with preset fingerprint matching data to obtain multiple matching values comprises:
matching the fingerprint information with at least one fingerprint template of at least one of the N groups of fingerprint templates respectively, to obtain multiple matching values.

17. The method of claim 16, wherein matching the fingerprint information with at least one fingerprint template of at least one of the N groups of fingerprint templates respectively comprises one of:
matching the fingerprint information with a fingerprint template most successfully matched of at least one of the N groups of fingerprint templates; and
matching the fingerprint information with a fingerprint template most successfully matched in a preset time period of at least one of the N groups of fingerprint templates.

* * * * *